(12) United States Patent
Keller et al.

(10) Patent No.: US 9,057,249 B2
(45) Date of Patent: Jun. 16, 2015

(54) $CO_2$ STORAGE IN ORGANIC-RICH ROCK FORMATION WITH HYDROCARBON RECOVERY

(75) Inventors: Stuart R Keller, Houston, TX (US); William B. Maze, Houston, TX (US); Gary F. Teletzke, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 419 days.

(21) Appl. No.: 13/578,806

(22) PCT Filed: Feb. 8, 2011

(86) PCT No.: PCT/US2011/024065
§ 371 (c)(1),
(2), (4) Date: Aug. 13, 2012

(87) PCT Pub. No.: WO2011/109143
PCT Pub. Date: Sep. 9, 2011

(65) Prior Publication Data
US 2012/0318533 A1     Dec. 20, 2012

Related U.S. Application Data

(60) Provisional application No. 61/310,997, filed on Mar. 5, 2010.

(51) Int. Cl.
*E21B 43/16*     (2006.01)
*E21B 41/00*     (2006.01)

(52) U.S. Cl.
CPC ........... *E21B 41/0064* (2013.01); *E21B 43/164* (2013.01); *Y02C 10/14* (2013.01)

(58) Field of Classification Search
CPC . E21B 43/006; E21B 43/164; E21B 41/0064; E21B 43/16
See application file for complete search history.

(56) References Cited

U.S. PATENT DOCUMENTS

| | | | |
|---|---|---|---|
| 4,605,066 | A | 8/1986 | Djabbarah |
| 5,439,054 | A | 8/1995 | Chaback et al. |
| 6,408,249 | B1 | 6/2002 | Teletzke |
| 6,412,559 | B1 | 7/2002 | Gunter et al. |
| 6,860,147 | B2 | 3/2005 | Gunter et al. |
| 7,172,030 | B2 | 2/2007 | Horner et al. |
| 7,360,595 | B2 | 4/2008 | Zupanick |
| 7,461,691 | B2 | 12/2008 | Vinegar et al. |
| 7,500,517 | B2 | 3/2009 | Looney et al. |
| 7,562,708 | B2 | 7/2009 | Cogliandro et al. |
| 8,839,875 | B2 | 9/2014 | Enis et al. |
| 2003/0047309 | A1 | 3/2003 | Thomas et al. |
| 2003/0142964 | A1 | 7/2003 | Wellington et al. |
| 2004/0033557 | A1 | 2/2004 | Scott et al. |
| 2004/0200618 | A1 | 10/2004 | Piekenbrock |
| 2007/0295503 | A1 | 12/2007 | Maguire |
| 2008/0257552 | A1 | 10/2008 | Shurtleff et al. |
| 2011/0209882 | A1* | 9/2011 | Enis et al. .................... 166/402 |

FOREIGN PATENT DOCUMENTS

| | | |
|---|---|---|
| EP | 1801346 | 6/2007 |
| WO | WO2007/110562 | 10/2007 |

OTHER PUBLICATIONS

Arthur, J. D., et al. (2009), "Evaluating Implications of Hydraulic Fracturing in Shale Gas Reservoirs", *SPE 121038*, Prepared for presentation at the 2009 SPE Americas E&P Environmental & Safety Conference held in San Antonio, Texas, Mar. 23-25.
Barlet-Goiedard, V., et al. (2006), "Mitigation Strategies for the Risk of $CO_2$ Migration Through Wellbores", *IADC/SPE 98924*, Prepared for presentation at the IADC/SPE Drilling Conference held in Miami, Florida Feb. 21-23.
Brooks, C. (2009), "Carbon sequestration may enhance energy production, Stanford researchers say", *Stanford Report*, Jul. 13 http://news.stanford.edu/news/2009/july22/carbon-sequestration-theory-071309%20.html.
Busch, A, et al. (2008), "Carbon dioxide storage potential of shales", *International Journal of Greenhouse Gas Control 2*, 297-308.
Durst, D.G. (2009), "Integrating Solid Expendables, Swellables, and Hydra Jet Perforating for Optimized Multizone Fractured Wellbores", *SPE 125345*, Prepared for presentation at the 2009 SPE Tight Gas Completions held in San Antonio, Texas Jun. 15-17.
Jahediesganjani, H, et al. (2006), "Effect of Resident Water on Enhanced Coal Gas Recovery by Simultaneous $CO_2 N_2$ Injection", *SPE 102634* Prepared for presentation at the 2006 SPE Annual Technical Conference and Exhibition held in San Antonio, Texas Sep. 24-27.
Jenkins, C.D. et al. (2008), "Coalbed- and Shale-Gas Reservoirs" *SPE 103514, Distinguished Author Series*, JPT Feb. 2008.
Krooss, B.M, et al. (2009), "Sorption and Desorption Processes of Methane and Carbon Dioxide on Coals and Shales—Experiments and Theory", Search and Discovery Article #40376, Adapted from oral presentation at AAPG Annual Convention, San Antonio, Apr. 20-23, 2008.
Kundert, D, et al. (2009), "Proper Evaluation of Shale Gas Reservoirs Leads to a More Effective Hydraulic-Fracture Stimulation", *SPE 123586*, Prepared for presentation at the 2009 SPE Rocky Mountain Petroleum Technology Conference held in Denver, Colorado, Apr. 14-16.
Lindeberg, H.T., et al. (2000), "Technologies and Possibilities for Larger-Scale $CO_2$ Separation and Underground Storage", Prepared for presentation at the 2000 SPE Annual Technical Conference and Exhibition held in Dallas, Texas, Oct. 1-4.

(Continued)

*Primary Examiner* — Zakiya W Bates
(74) *Attorney, Agent, or Firm* — ExxonMobil Upstream Research-Law Department (57) ABSTRACT

A method for producing hydrocarbons from and/or storing $CO_2$ in an organic-rich rock formation. One embodiment of the method includes the steps of injecting the $CO_2$ into an injection well in the organic-rich rock formation and producing the hydrocarbons from a production well when a drainage volume of the production well has an average reservoir pressure equal to or less than a predetermined pressure. The hydrocarbons substantially include natural gas and the injection well is in fluid communication with the production well. The embodiment also includes capping the production well and feeding the $CO_2$ into the injection well when the produced hydrocarbons include a $CO_2$ mole fraction greater than or equal to a predetermined mole fraction.

45 Claims, 10 Drawing Sheets

(56) References Cited

OTHER PUBLICATIONS

Lynch, M (2006) "Study Finds Plenty of Carbon Dioxide Storage Capacity Underground in Kentucky" University of Kentucky, Kentucky Geological Survey website, http://www.uky.edu/KGS/announce/carbondioxide.htm printed Aug. 6.

Matthews, H. L, et al (2007), "Stimulation of Gas Shales: They're All the Same-Right?" *SPE 106070*, Prepared for presentation at the 2007 SPE Hydraulic Fracturing Technology Conference held in College Station, Texas Jan. 29-31.

Nguyen, D. N. (2003), "Carbon Dioxide Geological Sequestration: Technical and Econommic Reviews", *SPE 81199*, Prepared for presentation at the SPE/EPA/DOE Exploration and Production Environmental Conferance held in San Antonio, Texas Mar. 10-12.

Nuttall, B. C., et al. (2005), "Analysis of the Devonian Black Shale in Kentucky for Potential Carbon Dioxide Sequestration and Enhanced Natural Gas Production", *Final Report DE-FC26-02NT41442*, Kentucky Geological Survey, Dec. 30, 2005.

Nuttall, B. C., (2008), "Scoping Outline for Testing Enhanced Gas Recovery (EGR) from the Devonian Black Shales of Kentucky using $CO_2$ Injection", *Kentucky Geological Survey*, Feb. 8, 2008.

Paktinat, J., et al. (2006), "Case Study: Optimizing Hydraulic Fracturing Performance in Northeastern United States Fractured Shale Formations", *SPE 104306*, Prepared for presentation at the 2006 SPE Eastern Regional Meeting held in Canton, Ohio, Oct. 11-13.

Schepers, K. C. et al. (2009), "Reservoir Modeling and Simulation of the Devonian Gas Shale of Eastern Kentucky for Enhanced Gas Recovery and $CO_2$ Storage", *SPE 126620*, Prepared for presentation at the Annual 2009 SPE International Conference on Capture, Storage, and Utilization held in San Diego, California, Nov. 10-11.

Vassilellis, G. D. (2009), "Roadmap to Monetization of Unconventional Resources", SPE 121968, Prepared for presentation at the Annual 2009 SPE EUROPEC/EAGE Annual Conference and Exhibition held in Amsterdam, The Netherlands, Jun. 8-11.

Vermylen, J.P. et al. (2008), "Feasibility Assessment of $CO_2$ Sequestration and Enhanced Recovery in Gas Shale Reservoirs" Smithsonian/NASA Astrophysics Data System, American Geophysical Union, Fall Meeting 2008, abstract #H23D-0990; http://adsabs.harvard.edu/abs/2008AGUFM.H23D0990V.

Warpinski, N. R., et al. (2008) "Stimulating Unconventional Reservoirs: Maximizing Network Growth While Optimizing Fracture Conductivity," *SPE 114173* Society of Petroleum Engineers paper, presented at the SPE Unconventional Reservoirs Conference, Keystone, CO, Feb. 10-12.

White, C. M. et al (2005) "Sequestration of Carbon Dioxide in Coal with Enhanced Coalbed Methane Recovery—A Review" *Energy & Fuels*, vol. 19, No. 3, p. 559-724.

Zahid, S., et al. (2007), "Development of Unconventional Gas Resources: Stimulation Perspective", SPE 107053, Paper was prepared for presentation at the 2007 SPE Production and Operations Symposium held in Oklahoma City, Mar. 31-Apr. 3.

Barnett Shale—Wikipedia article on Barnett Shale, Texas, Aug. 6, 2009.

New York State Environmental Monitoring, Evaluation & Protection (NYSERDA), (2009), "Carbon Capture and Sequestration in New York State", *New York State SERDA*, accessed on the Internet on Aug. 6, 2009.

Carbon Sequestration Atlas, (2008).

\* cited by examiner

CO₂ STORAGE IN ORGANIC-RICH ROCK FORMATION WITH HYDROCARBON RECOVERY

CROSS-REFERENCE TO RELATED APPLICATION

This application is the National Stage of International Application No. PCT/US2011/024065, filed 8 Feb. 2011, which claims priority benefit of U.S. Provisional Patent Application 61/310,997 filed 5 Mar. 2010 entitled CO₂ STORAGE IN ORGANIC-RICH ROCK FORMATION WITH HYDROCARBON RECOVERY, the entirety of which is incorporated by reference herein.

FIELD OF THE DISCLOSURE

This disclosure relates generally to storage of carbon dioxide ($CO_2$). More particularly, this disclosure relates to storage of $CO_2$ in an organic-rich rock formation with optional enhanced recovery of a hydrocarbon.

TECHNOLOGY BACKGROUND

This section is intended to introduce various aspects of the art, which may be associated with exemplary embodiments of the presently disclosed invention. This discussion is believed to assist in providing a framework to facilitate a better understanding of particular aspects of the presently disclosed invention. Accordingly, it should be understood that this section should be read in this light, and not necessarily as admissions of prior art.

Production of natural gas from low-permeability shale formations is rapidly increasing in the United States and elsewhere. For example, the Barnett shale in northern Texas has produced more than 3.3 trillion cubic feet (tcf) since 2000 and currently produces more than 3.1 billion cubic feet per day (bcfd). Recoverable natural gas reserves for the Barnett shale alone are estimated to be in the range of 7-20 tcf.

Shales that host economic quantities of natural gas may have a number of common properties. In general, they are very fine-grained sedimentary rocks that are rich in organic material (e.g., 0.5% to 25%) and are usually mature petroleum source rocks in the thermogenic gas window, where high heat and pressure have converted petroleum to natural gas. They are sufficiently brittle and rigid enough to maintain open fractures. The gas content of such shales typically is in the range 30 to 500 standard cubic feet per ton of shale. The natural gas found in shale formations is formed primarily of methane, but it can also include ethane, propane, butane, and pentane and inert components such as $CO_2$, $N_2$, and $H_2S$. The composition of natural gas can vary widely, but Table 1 shows the contents of a typical unrefined natural gas supply.

TABLE 1

Composition of Natural Gas (typical)

| Methane | $CH_4$ | 70-90% |
| Ethane | $C_2H_6$ | 0-20% |
| Propane | $C_3H_8$ | |
| Butane | $C_4H_{10}$ | |
| Carbon Dioxide | $CO_2$ | 0-8% |
| Oxygen | $O_2$ | 0-0.2% |
| Nitrogen | $N_2$ | 0-5% |
| Hydrogen sulfide | $H_2S$ | 0-5% |
| Rare gases | A, He, Ne, Xe | Trace |

Despite the rapid increase in exploitation of shale gas resources, there are significant opportunities for optimization of gas production rate and recovery. Shale has low matrix permeability, so gas production in commercial quantities requires fractures to provide permeability. Gas shale formations may contain natural fractures, but hydraulic fracturing is generally required to induce additional fractures and enable economic production of the gas. Presently the preferred method for primary production of gas from shale generally consists of drilling a horizontal well and then performing multiple slick-water fracture jobs. Slick-water fracturing is a hydraulic fracturing treatment using water with viscosity reducer. This method enables typical initial well rates in the range of 3-10 million cubic feet per day (mcfd). Published estimates indicate that this method only recovers between 5% and 20% of the available gas. Such rates and recovery factors are much lower than those typically achieved in conventional gas resources.

The exact mechanism by which natural gas is stored in low-permeability shale is not well understood; however, much of the gas is believed to reside as free gas in the tight pore space within the shale and in natural fractures. In addition, a significant fraction of the gas is believed to be adsorbed onto organic material and clays within the shale. These mechanisms are similar to the dominant methane storage mechanisms in coal-bed methane deposits and it is believed that $CO_2$ will displace and replace adsorbed methane in coal.

It is also anticipated that, in the future, there will be significant incentives to store large quantities of $CO_2$ underground to reduce greenhouse gas emissions to the atmosphere. Conventional research is focused on deep saline formations as the primary geologic medium for subsurface $CO_2$ storage. However, there are significant challenges associated with storing $CO_2$ in deep saline formations. For example, the deep saline formations would need to be close to the sources of $CO_2$ and the subsurface formations would need to have a suitable trap and top seal so that the $CO_2$ does not escape for periods exceeding centuries. Another major concern is the disposition of the large volumes of brine that will be displaced by the injected $CO_2$.

It has been suggested that a potential solution might be to inject $CO_2$ into shale formations both to enhance displacement of the in-place natural gas and to store $CO_2$. As such there is a need for an improved method for facilitating such displacement of natural gas and storage of $CO_2$.

SUMMARY

According to the present disclosure, a method for producing hydrocarbons from and storing $CO_2$ in an organic-rich rock formation is provided. The method comprises injecting the $CO_2$ into an injection well in the organic-rich rock formation and producing the hydrocarbons from a production well when a drainage volume of the production well has an average reservoir pressure equal to or less than a predetermined pressure. The hydrocarbons substantially include natural gas and the injection well is in fluid communication with the production well. The method also includes capping the production well and feeding the $CO_2$ into the injection well when the produced hydrocarbons include a $CO_2$ mole fraction greater than or equal to a predetermined mole fraction.

Also according to the present disclosure, a method for storing $CO_2$ in an organic-rich rock formation is provided. The method comprises reducing average reservoir pressure in a drainage volume of a production well until the average reservoir pressure in the drainage volume is equal to a first predetermined pressure, and feeding the $CO_2$ into an injection well. The injection well is in fluid communication with the production well.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Definitions

Various terms as used herein are defined below. To the extent a term used in a claim is not defined below, it should be given the definition persons in the pertinent art have given that term.

As used herein, the "a" or "an" entity refers to one or more of that entity. As such, the terms "a" (or "an"), "one or more", and "at least one" can be used interchangeably herein unless a limit is specifically stated.

As used herein, the terms "comprising," "comprises," "comprise," and "comprised" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise."

As used herein, the term "production well" may refer to a well that is drilled into a reservoir and used to recover a hydrocarbon material.

As used herein, the term "injection well" may refer to a well that is drilled into a reservoir and used to deliver a substance to the reservoir.

As used herein injection, inject, and injected generally refer to the delivery of a substance into a reservoir.

As used herein the terms feeding, feed, and fed generally mean the same as injection, inject and injected.

As used herein, the terms "having," "has," and "have" have the same open-ended meaning as "comprising," "comprises," and "comprise."

As used herein, the terms "including," "includes," and "include" have the same open-ended meaning as "comprising," "comprises," and "comprise."

As used herein, the term "shale formation" means a geological formation comprising substantially a fine-grained sedimentary rock composed primarily of silt and clay sized particles and having an organic content of at least about 0.5 percent by weight and natural gas content of at least 30 standard cubic feet per ton.

Description

In the following detailed description section, specific embodiments of the present invention are described in connection with preferred embodiments. However, to the extent that the following description is specific to a particular embodiment or a particular use, this is intended to be for exemplary purposes only. Accordingly, the invention is not limited to the specific embodiments described below, but rather, it includes all alternatives, modifications, and equivalents falling within the scope of the appended claims.

Figure 1:
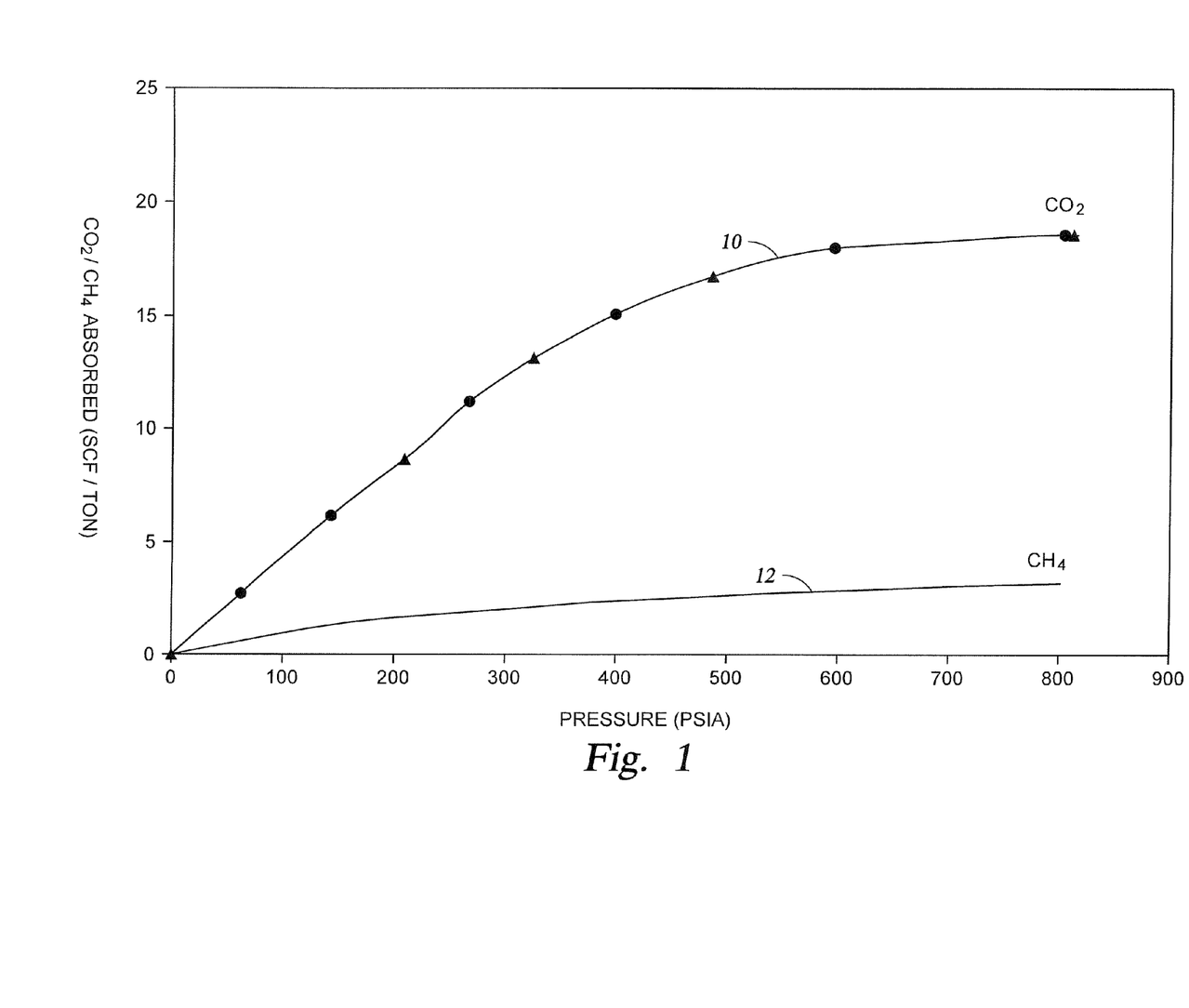
FIG. 1 is a plot illustrating the preferred adsorption of $CO_2$ over $CH_4$ in Ohio shale.

In general the present disclosure provides a method for enhancing production of hydrocarbons from and/or storage of $CO_2$ in a subterranean organic-rich formation such as shale. The method involves using an injection well to introduce $CO_2$ into the formation. For example, $CO_2$ could be injected via horizontal wells containing multiple hydraulic fractures. In at least one preferred embodiment the method may be implemented in connection with depleted (i.e., post-primary production) horizontal wells in shale gas formations Shale formations, in particular, may make excellent $CO_2$ storage reservoirs because the $CO_2$ generally tends to adsorb to and absorb in the organic matter in the shale. As illustrated in FIG. 1, the adsorption of $CO_2$, plot line 10, is preferred by a factor of approximately five over methane ($CH_4$), plot line 12, at least in a specific shale formation known as the Ohio shale formation. In addition to storage, the preference for $CO_2$ may assist in the production of hydrocarbons from the shale, such as natural gas, as the $CO_2$ may more readily displace the methane from the shale as compared with other gases.

Figure 2A:
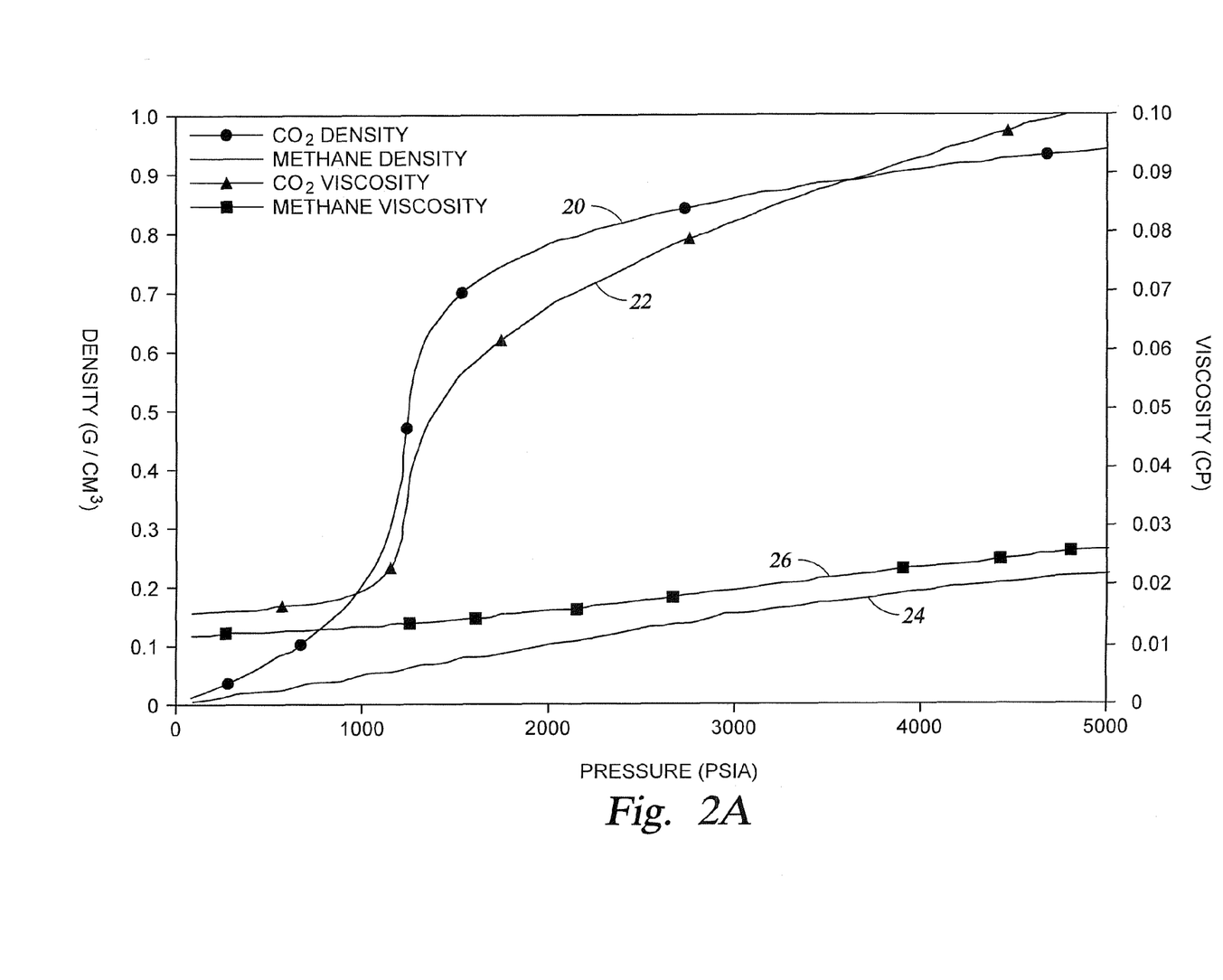
FIG. 2A is a plot illustrating the density and viscosity of $CO_2$ and $CH_4$ across a range of pressures with temperature at 100° F.
Figure 2B:
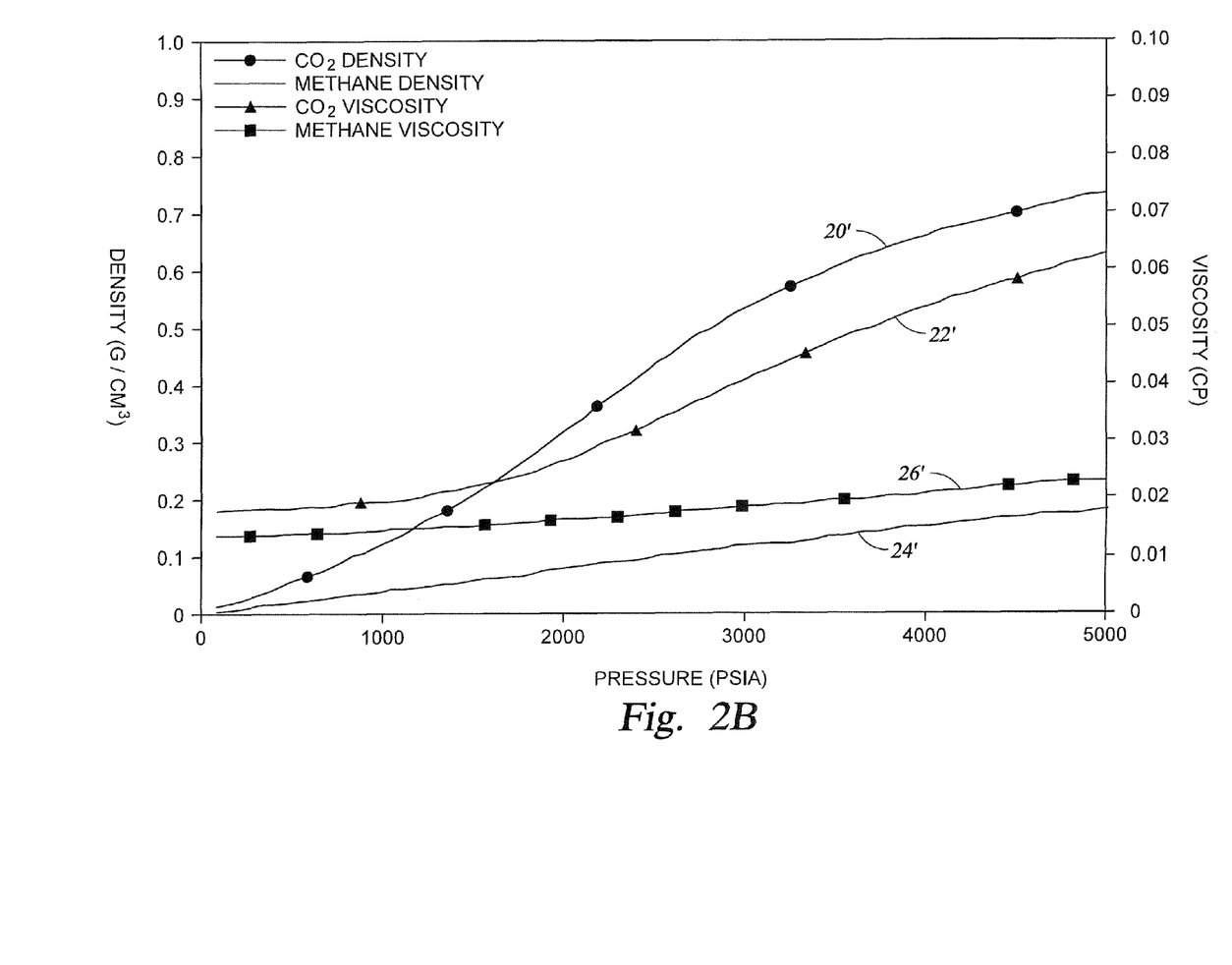
FIG. 2B is a plot illustrating the density and viscosity of $CO_2$ and $CH_4$ across a range of pressures with temperature at 200° F.

As illustrated by plot lines 20 and 20' of FIGS. 2A and 2B, the density of $CO_2$ rapidly increases beyond its critical pressure of approximately 1071 psi. Similarly, the viscosity of $CO_2$ also increases abruptly at pressures above the critical pressure, see plot lines 22 and 22'. As can be verified through a comparison of FIGS. 2A and 2B, the rate of increase of density and viscosity with increasing pressure is most pronounced at temperatures close to the critical temperature of $CO_2$ (i.e., approximately 88 degrees F.). Nonetheless, the rate of increase remains significant at temperatures significantly greater than the critical temperature (see FIG. 2B). FIGS. 2A and 2B also show that the density and viscosity of $CO_2$ (plot lines 20/20' and 22/22' respectively) are significantly greater than the corresponding properties of methane under conditions where $CO_2$ is a supercritical fluid (see plot lines 24/24' and 26/26').

Thus, in one embodiment it may be particularly beneficial to inject the $CO_2$ at a bottom-hole pressure (BHP) less than or equal to about 1071 psi as the critical pressure generally represents the highest pressure at which the $CO_2$ has a relatively low viscosity. Low viscosity generally facilitates the entry of the $CO_2$ into the shale and the adsorption of the $CO_2$ to the organic matter. Nonetheless, as shown in FIG. 1, adsorption and absorption of $CO_2$ generally increases with pressure. In addition, the mass of $CO_2$ stored as free gas in the pore space of shale is generally greater at pressures greater than the critical pressure due to the rapid increase in $CO_2$ density above the critical pressure (see FIGS. 2A-B).

Consequently, one or more preferred embodiments may inject the $CO_2$ at a bottom-hole injection pressure that is somewhat greater than the critical pressure. In such a preferred embodiment approximately two to five times as much $CO_2$ may be stored in the formation as compared to the $CH_4$ produced from the formation. This is illustrated by plot line 30 in FIG. 3, which shows the ratio of stored $CO_2$ to displaced $CH_4$ as a function of pressure, calculated using the data shown in FIGS. 1 and 2A. Accordingly, one or more preferred embodiments may inject the $CO_2$ at a bottom-hole injection pressure between about 1250 and 1900 psi, within which range the ratio of stored $CO_2$ to displaced $CH_4$ is greater than three.

Figure 3:
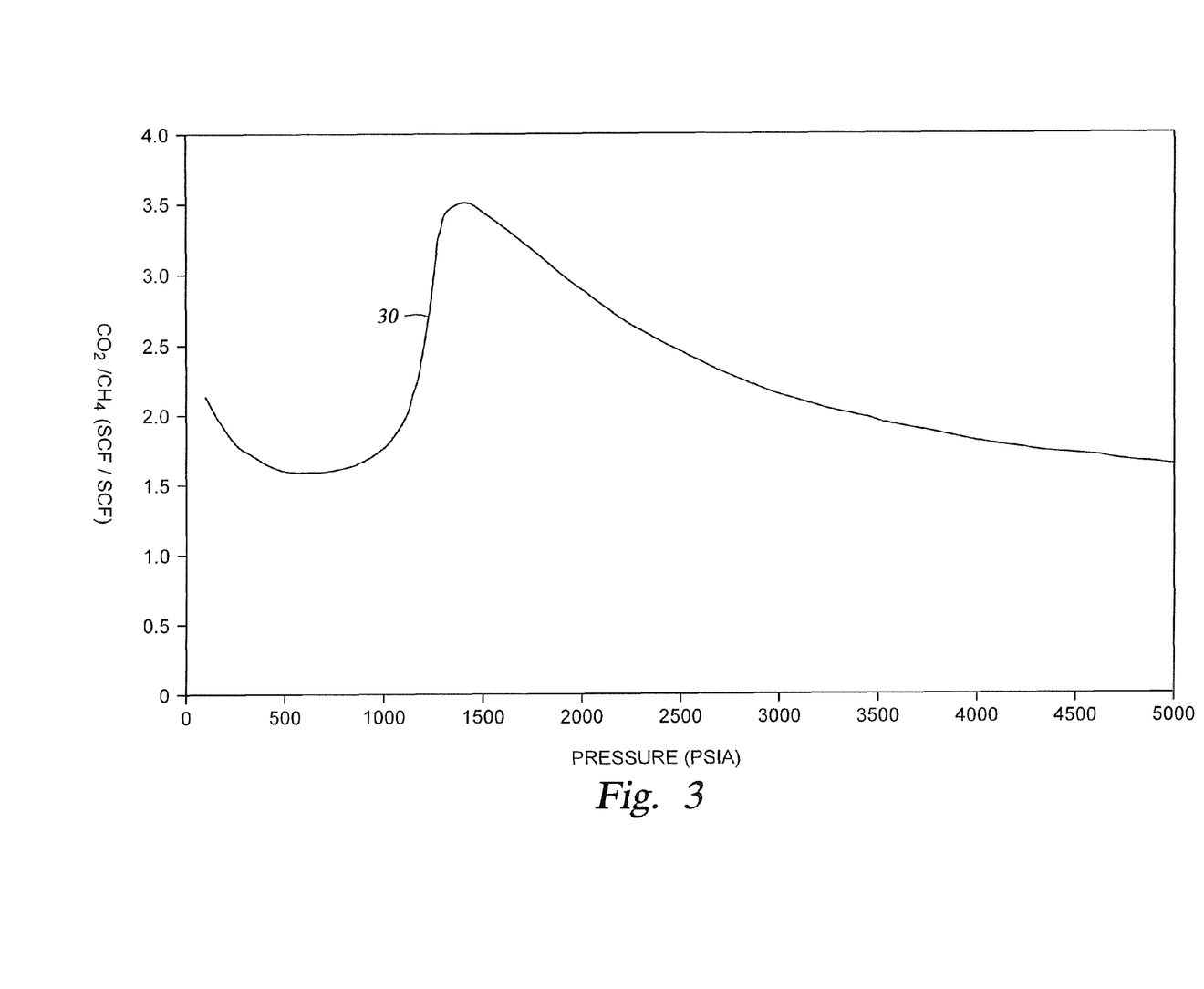
FIG. 3 is an plot illustrating a calculated ratio of stored $CO_2$ to displaced $CH_4$ as a function of pressure.

More specifically, the curve in FIG. 3 was calculated by assuming that the methane originally present in a shale formation is completely replaced by $CO_2$. The total gas in place may then be represented as:

total gas in place=free gas+adsorbed gas

The ratio of stored $CO_2$ to displaced methane is given by:

$$\text{Stored } CO_2 / \text{Displaced } CH_4 = \frac{\text{free } CO_2 + \text{adsorbed } CO_2}{\text{free } CH_4 + \text{adsorbed } CH_4}$$

The free gas can be calculated using the following equation:

$$\text{free gas } (scf/\text{ton}) = 3.21 \frac{\phi_g}{\rho_g(1-\phi)B_g}$$

where $\phi_g$ is the gas-filled porosity (fraction), $\rho_g$ is the grain density of the shale (g/cm$^3$), $\phi$ is total porosity (fraction), $B_g$ is the gas formation volume factor (i.e., volume at reservoir temperature and pressure/volume at standard temperature and pressure). The constant 3.21 converts cm$^3$/g to ft$^3$/ton.

The adsorbed gas may be determined directly from experimental measurements such as those shown in FIG. 1. Alternatively, when limited data points are available, the adsorbed gas may be estimated from models such as the Langmuir equation:

$$\text{adsorbed gas } (scf/\text{ton}) = \frac{V_L P}{P_L + P}$$

where $V_L$ is the Langmuir volume parameter and $P_L$ is the Langmuir pressure parameter.

Shale gas formations may occur at initial pressures greatly exceeding (e.g., 3000-4000 psi) the critical pressure of $CO_2$. In such formations, it may be particularly beneficial to first reduce the average reservoir pressure, through a period of primary hydrocarbon production or the like, to below about 2000 psi.

Figure 4:
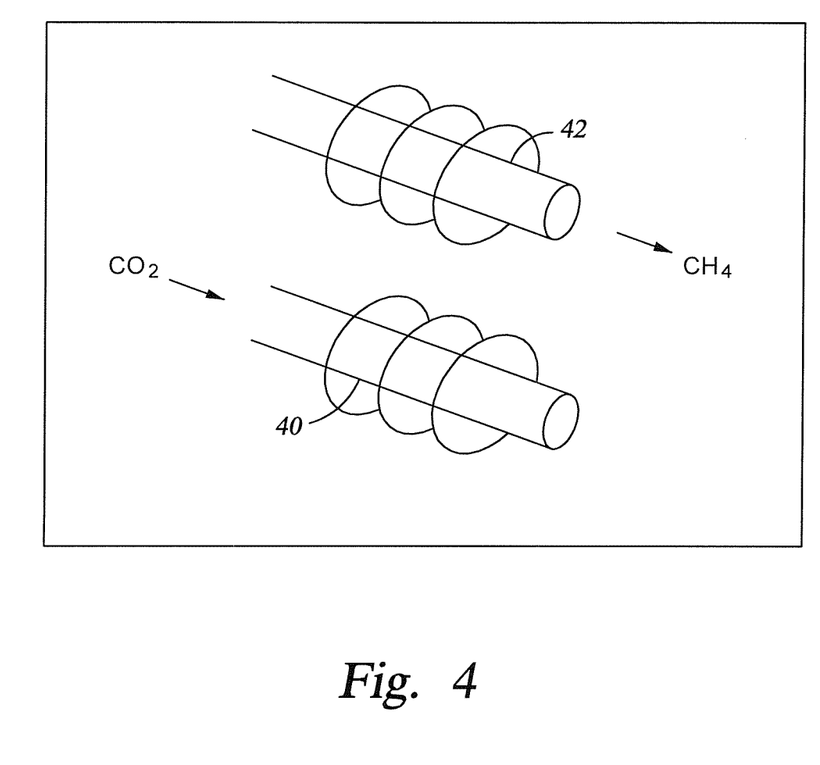
FIG. 4 illustrates a wellbore configuration that may be implemented in connection with at least one embodiment of the present invention.

In at least one preferred embodiment, then, an operational pressure may be determined based on the above referenced considerations. $CO_2$ may then be injected into an organic-rich formation via a horizontal well containing multiple fractures. More specifically, parallel horizontal, vertically separated wells maybe drilled into a methane-rich shale formation. Multiple vertical fractures may then be generated in one or both wells. $CO_2$ injection would be initiated after an initial period of primary production depletes the average reservoir pressure to below the operational pressure (e.g., about 2000 psi). The $CO_2$ may be injected into one well while methane may be produced from the other well. Per the example shown in FIG. 4, $CO_2$ may be injected into a lower well 40 to take advantage of the fact that $CO_2$ is denser than methane and, therefore, supports an efficient gravity-stable displacement of the methane, which is produced from well 42.

One or more of the embodiments may also use cyclical (as opposed to constant) $CO_2$ injection as a way to control fracture network conductivity and connectivity, improve $CO_2$ injectivity and enhance $CO_2$ sorption. In such an embodiment, the reduction in fracture network conductivity caused by swelling associated with $CO_2$ sorption may be counteracted by injecting the $CO_2$ at a pressure somewhat greater than the final pressure attained at the end of the primary gas production phase but less than the fracture initiation pressure. Injection at pressures below the fracture initiation pressure will prevent the formation of new fractures that could cause short-circuiting of the $CO_2$ from the injection well to the production well.

Figure 5:
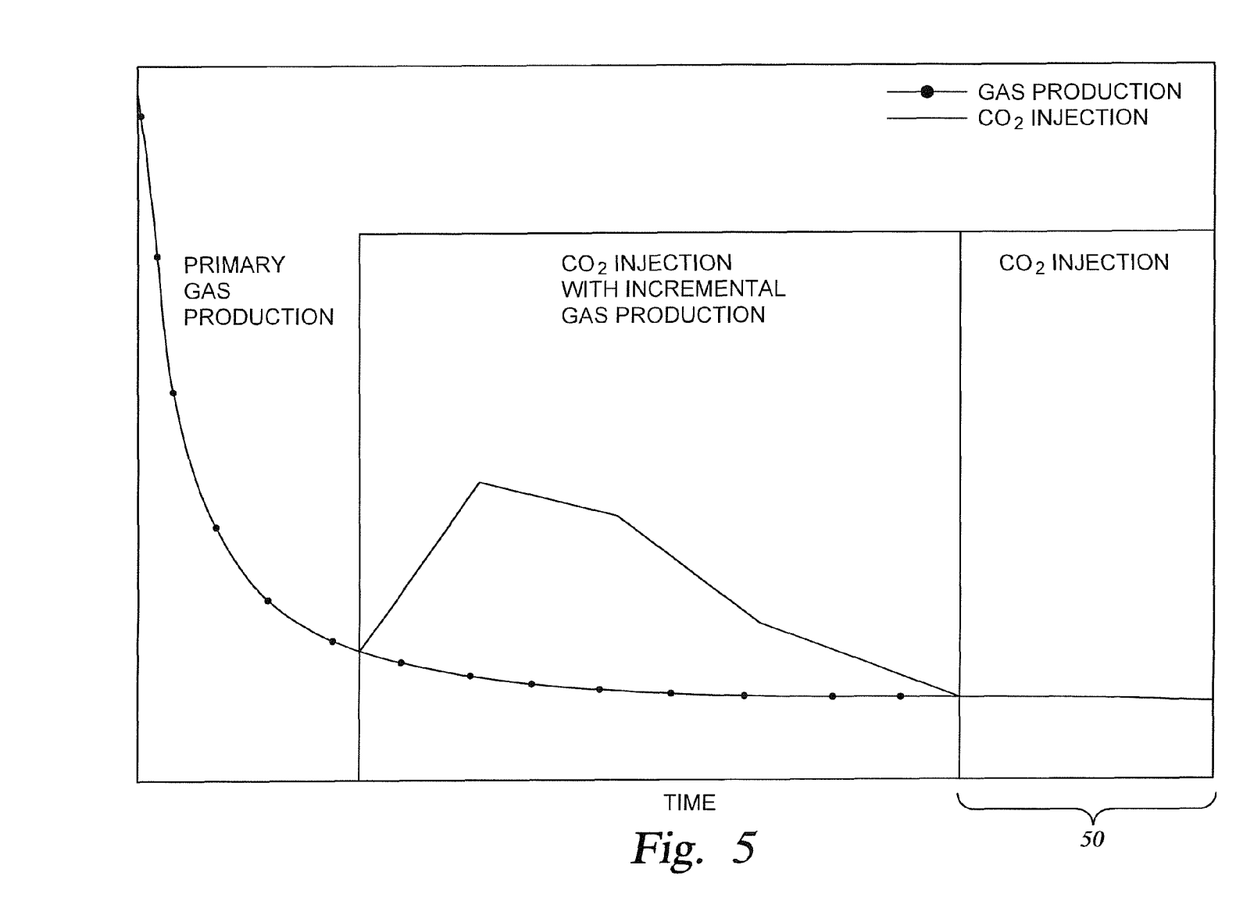
FIG. 5 illustrates an exemplary sequence of operations according to one embodiment of the present invention.

As illustrated in FIG. 5, another phase 50 may be included during which gas production ceases while $CO_2$ is still being injected, making the phase 50 substantially a $CO_2$ storage operation. The production wells are generally shut in during this phase and pressure in the shale formation increases, causing the mass of stored $CO_2$ to increase due the increase of both adsorbed $CO_2$ and density of the free $CO_2$ in the pore space.

Figure 6:
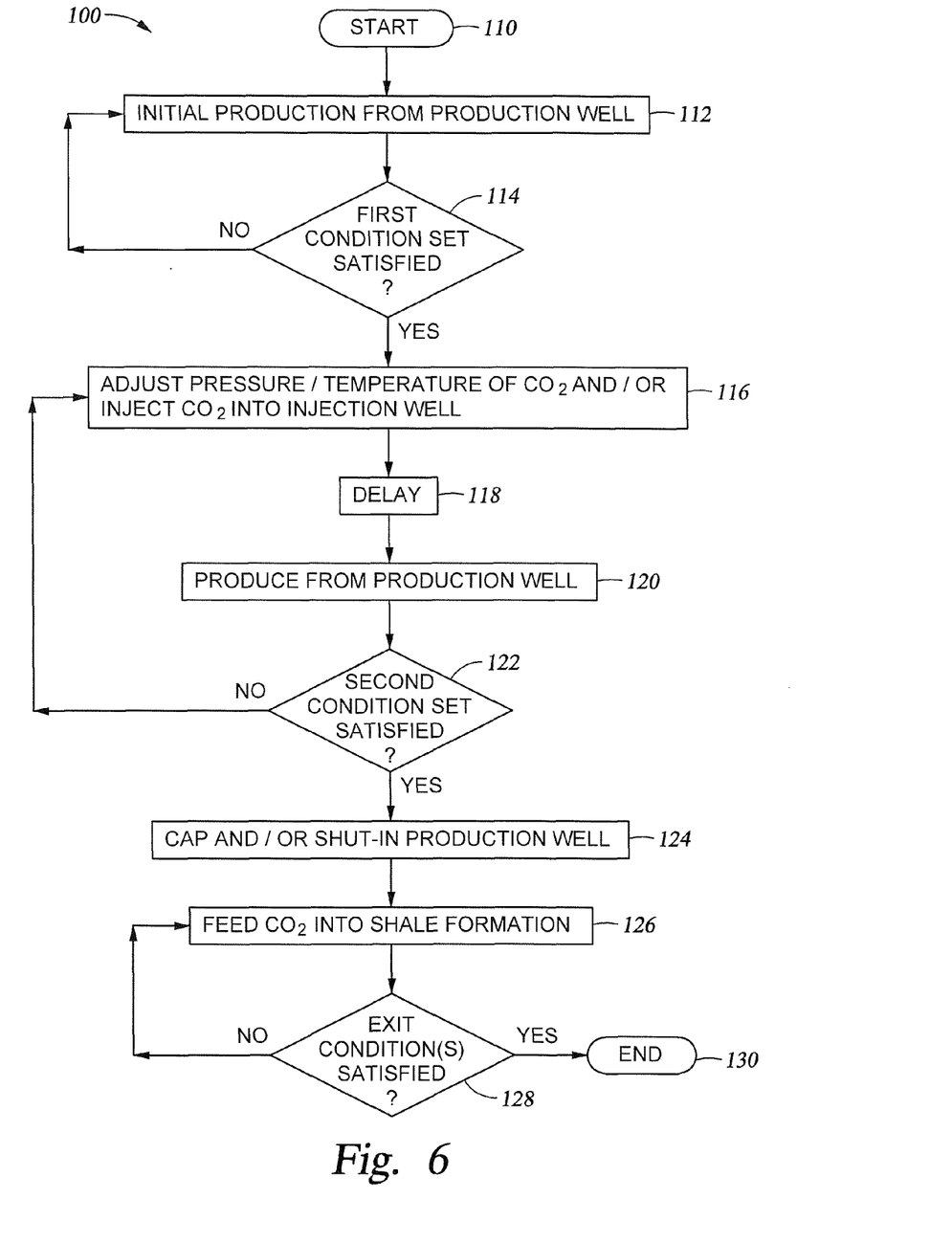
FIG. 6 is a flow diagram of a method for producing hydrocarbons from and storing $CO_2$ in an organic-rich rock formation in accordance with at least one embodiment of the present invention.

Referring, now, to FIG. 6, a flow diagram is provided of a method 100 for producing hydrocarbons from and storing $CO_2$ in an organic-rich rock formation. In at least one preferred embodiment, the hydrocarbons are substantially comprised of natural gas and the organic-rich rock formation is a shale formation. The method 100 may be advantageously implemented in connection with any appropriate system to meet the design criteria of a particular application, such as one or more of the systems shown in and described with reference to FIGS. 7A-B and 8 of the present disclosure. The method 100 generally includes a plurality of blocks or steps (e.g., 102, 104, 106, etc.) that may be performed serially. As will be appreciated by one of ordinary skill in the art, the order of the steps shown in FIG. 6 is exemplary and the order of one or more steps may be modified within the spirit and scope of the present invention. Additionally, the steps of the method 100 may be performed in at least one non-serial (or non-sequential) order, and one or more steps may be omitted to meet the design criteria of a particular application. Block 110 represents an entry point into the method 100.

Block 112 generally represents an optional initial production from a corresponding production well. Such an initial production may prepare the production and/or corresponding injection well to satisfy one or more of the first set of conditions at decision block 114. In at least one embodiment, the method 100 effectively remains at block 112 until the average reservoir pressure is less than or equal to a predetermined pressure (e.g., while the average reservoir pressure of the production well is greater than a predetermined pressure). For example, the method 100 may remain at block 112 for a period of initial Production in order to reduce pressure in drainage volume of the injection and/or production well. However, any appropriate set of conditions (including a set of a single condition) may be implemented to satisfy the design criteria of a particular application. The method 100 generally falls through to block 116 when the first set of conditions is satisfied and returns to block 112 when the first set of conditions is not satisfied.

At block 116 $CO_2$ is injected into the organic rich rock formation, such as a shale formation. In at least one embodiment, the $CO_2$ is injected at a bottom-hole pressure between 500 psi and 3500 psi. In at least one other embodiment the $CO_2$ is injected at a bottom-hole pressure between 1000 psi and 2000 psi. However, the $CO_2$ may be injected at any appropriate pressure to satisfy the design criteria of a particular application. In particular, in one or more embodiments, the pressure of the $CO_2$ may be adjusted to a predetermined value such that the injected $CO_2$ more readily displaces hydrocarbons, such as natural gas. In general, the predetermined value may be determined by any appropriate technique such as by measuring an adsorption isotherm of the $CO_2$ in the organic-rich rock formation at a plurality of pressures. In addition or in the alternative, a model may be used to determine the predetermined value. In such an embodiment, the model may include inputs corresponding to at least one of an adsorption isotherm, a chemical and/or physical behavior of $CO_2$ in rock formation pore space, and a chemical and/or physical behavior of $CO_2$ in rock formation natural fractures.

Similarly, in one or more embodiments, the temperature of the $CO_2$ may be adjusted, using any appropriate technique, to a predetermined temperature such that the injected $CO_2$ displaces hydrocarbons (e.g., natural gas) in the organic-rich rock formation (e.g., shale) at an increased rate. For example, the predetermined temperature may be determined by measuring an adsorption isotherm of the $CO_2$ in the organic-rich rock formation at a plurality of temperatures. In addition or in the alternative, a model may be used to determine the predetermined temperature. In such an embodiment the model may include inputs corresponding to at least one of an adsorption isotherm, a chemical and/or physical behavior of $CO_2$ in rock formation pore space, and a chemical and/or physical behavior of $CO_2$ in rock formation natural fractures.

One or more embodiments may also implement injection pulsing and/or cycling. In injection pulsing the supply of $CO_2$ is alternated between an on and a substantially off state. In injection cycling, the pressure of the $CO_2$ is cycled during the injecting step between first and second predetermined $CO_2$ injection pressure levels. Each of the on/off states and/or the first and second predetermined $CO_2$ injection pressure levels may be maintained for first and second times (i.e., periods, durations, etc.), respectively. In general, the first and second times are determined by measuring a sorption time of $CO_2$ in the organic-rich rock formation, but any appropriate duration(s) may be implemented to satisfy the design criteria of a particular application. Furthermore, the first and second times may be held constant or modified between pulsing and/or injection cycles.

In general, the higher the diffusivity, the shorter the sorption time. The optimum injection time(s) may depend on a number of factors including but not necessarily limited to the sorption time (i.e., $T_S$). For example, for the same injection time and volume, $CO_2$ will tend to travel further before being sorbed in a higher $T_S$ shale formation than in a lower $T_S$ shale formation since $CO_2$ will be sorbed more quickly in the lower $T_S$ shale formation. The appropriate injection time can be selected in view of the $T_S$ of the injected $CO_2$, as well as other reservoir properties and operating parameters, and may be selected such that the injected $CO_2$ does not break through rapidly to the producing well. The desired injection time and volume is generally inversely proportional to $T_S$. Consequently, in the range of possible injection times and with all other factors being constant, lower injection times should generally be used in higher $T_S$ shale formations, and higher injection times should generally be used in lower $T_S$ shale formations.

Using shorter injection times in higher $T_S$ shale formations increases the sorbed $CO_2$ concentration in the $CO_2$-contacted portion of the shale formation. As such, the injected $CO_2$ becomes a higher percentage of the contacted-region-sorbed gas, other reservoir properties and operating parameters being constant. Accordingly, the time required for $CO_2$ to breakthrough to the producing well is increased.

In addition to sorption time, other reservoir properties and operating parameters may be considered when determining an appropriate injection time. These other factors may include, without limitation, shale formation thickness, the magnitude of the fracture network's porosity and permeability, sorption capacity of the shale matrix for the injected $CO_2$, volume of current $CO_2$ injection, injection rate for current $CO_2$ injection, the number of previous $CO_2$ injection/soak cycles, and $CO_2$ volume injected in previous cycles.

During a cyclic injection process, it may be advantageous to cycle the pressure in the fracture network around the critical pressure of $CO_2$ so as to cause rapid volumetric expansion of the $CO_2$ during the depressurization phase of the cycle. In at least one embodiment, the rapid expansion of the $CO_2$ may increase fracture aperture and enhance the continuity of the fracture network, thereby improving $CO_2$ injectivity and increasing the volume of shale contacted by $CO_2$. Releasing the stored energy of supercritical $CO_2$ may also drive the displaced gas to the production well.

In one or more embodiments, pressure cycling may be accomplished by shutting in offset production wells during a portion of the $CO_2$ injection time, to build pressure in the fracture network, and then opening the offset production wells to reduce pressure and cause expansion of the $CO_2$. In such operations, it may be even more advantageous to inject the $CO_2$ as a cold liquid to maximize the density change and thus the amount of stored energy transferred to the formation. Injection of $CO_2$ as a cold liquid may also impart a thermal shock that may help to enhance continuity of the fracture network.

Numerous other configurations may also be implemented to increase the rate of displacement of hydrocarbons by $CO_2$, to increase the storage (e.g., via adsorption and/or absorption) of $CO_2$ in the corresponding rock formation, and/or to minimize undesirable fracturing of a well. For example, in one embodiment, the $CO_2$ may be injected at a temperature less than or equal to 88 degrees Fahrenheit and a pressure greater than the vapor pressure of the $CO_2$ at the injection temperature. In another embodiment the $CO_2$ may be injected at a pressure less than a fracture pressure of the organic-rich rock formation. In yet another embodiment liquid $CO_2$ may be used for well injection. In still yet another embodiment the $CO_2$ may be injected such that the injection well has a bottom-hole pressure greater than 1071 psi when the production well has a bottom-hole pressure less than 1071 psi. In still yet another embodiment the $CO_2$ may be injected such that the injection well has a bottom-hole pressure greater than a bottom-hole pressure of the production well and less than a fracture pressure of the organic-rich rock formation.

Block 118 represents an optional time delay between the injection step of 116 and the production step of 120. The use of a time delay (i.e., Δt) may be particularly beneficial when the injection and production wells are the same physical well. Such a scenario is discussed later in the present disclosure in connection with FIG. 7B. Alternatively, the production well and the injection well may correspond to physically distinct wellbores and the production well may capped off for a predetermined shut-in period. In at least one embodiment the predetermined shut-in period corresponds to the sorption time of $CO_2$ in the organic-rich rock formation.

At block 120, hydrocarbons (e.g., natural gas) are generally produced from a production well in fluid communication with the injection well. Once again, in at least one embodiment the injection and the production wells may be physically the same well. Alternatively, the injection and production wells may be physically distinct wells. In at least one embodiment the production step 120 may be performed concurrent with the injection step 116.

At decision block 122 a second set of conditions are evaluated. In at least one embodiment the method 100 falls through to block 124 when the produced hydrocarbons include a $CO_2$ mole fraction greater than or equal to a predetermined mole fraction (e.g., 25%, 60% or 90%) and/or the average reservoir pressure is less than a second predetermined pressure (e.g., a pressure substantially between 1000 psi and 1100 psi). However, any appropriate set of conditions (including a set of a single condition) may be implemented to satisfy the design criteria of a particular application. The method 100 generally falls through to block 124 when the set of second conditions is satisfied and returns to block 116 when the second set of conditions is not satisfied.

At block 124 the production well may be capped and/or shut-in.

At block 126 $CO_2$ is fed into the organic rich rock formation, such as a shale formation, via a wellbore, such as the injection well. The feeding step 126 is similar to the injecting step of 116 with the exception that the focus is on storage of the $CO_2$ in the formation rather than extraction of hydrocarbons, such as natural gas, from the formation. As such, the $CO_2$ may be fed into the injection well at a bottom-hole pressure between 500 psi and 3500 psi, between 1000 psi and 2000 psi, or any other appropriate pressure to satisfy the design criteria of a particular application. In addition the $CO_2$ may be fed into the injection well at any appropriate temperature, including temperatures which result in liquid $CO_2$, to satisfy the design criteria of a particular application One or more embodiments may also implement feed pulsing and/or cycling at block 126. In feed pulsing the supply of $CO_2$ is alternated between an on and a substantially off state. In feed cycling, the pressure of the $CO_2$ is cycled during the feeding step between first and second predetermined $CO_2$ feed pressure levels. Each of the on/off states and/or the first and second predetermined $CO_2$ feed pressure levels may be maintained for first and second feed times (i.e., periods, durations, etc.), respectively. The first and second feed times may be determined by measuring a sorption time of $CO_2$ in the organic-rich rock formation but any appropriate duration(s) may be implemented to satisfy the design criteria of a particular application. Furthermore, the first and second feed times may be held constant or modified between pulsing and/or feed cycles.

Any appropriate set of criteria may be evaluated at decision block 128 to determine whether the method 100 should effectively remain in step 126 or fall through to block 130. Block 130 represents an exit point out of the method 100.

Figure 7A:
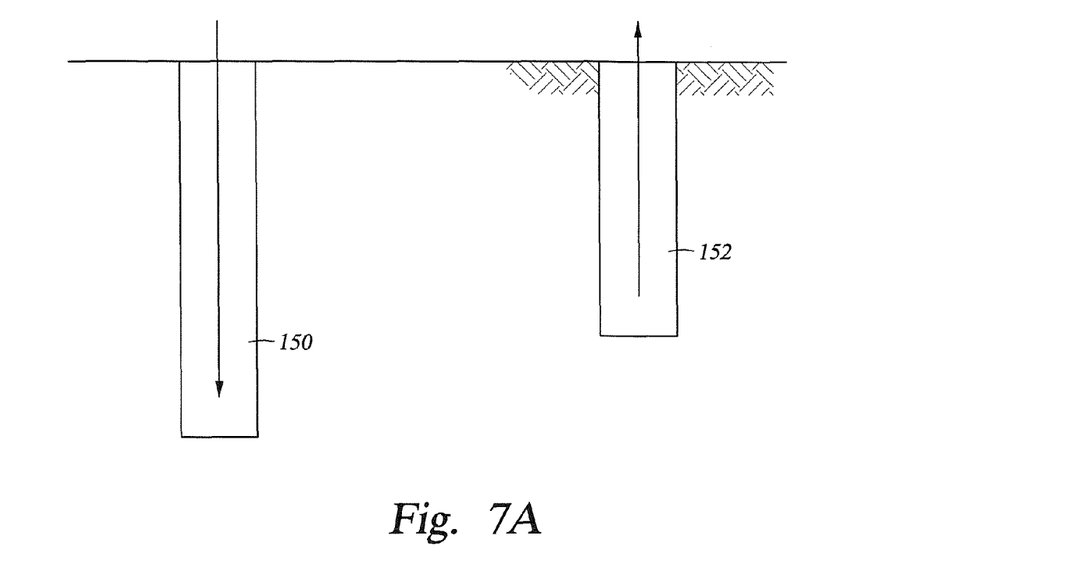
FIG. 7A illustrates an embodiment of the present invention wherein the injection and production wells are physically distinct wellbores.

FIG. 7A illustrates an embodiment wherein the injection 150 and production 152 wells are two physically distinct wellbores. In at least one such embodiment, the depth of the injection well 150 may be greater than the depth of the production well 152 and such unequal depths may act to increase production of a hydrocarbon (e.g. natural gas) as compared to injection 150 and production 152 wells of substantially equal depths.

Figure 7B:
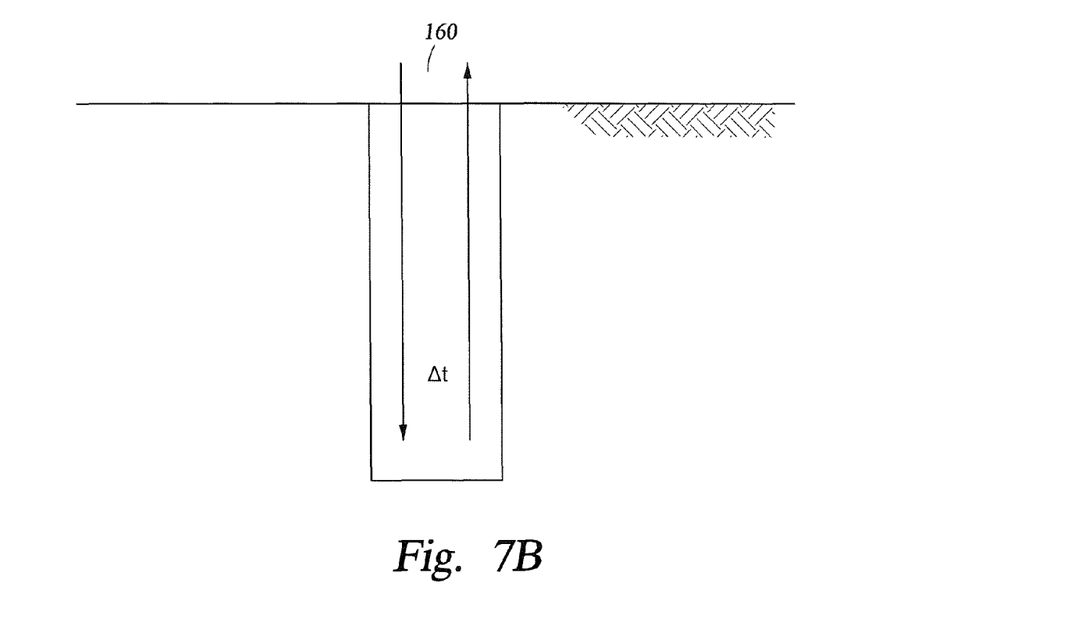
FIG. 7B illustrates an embodiment of the present invention wherein the injection and production wells are physically the same wellbore.

FIG. 7B illustrates an embodiment wherein the injection and production wells are the same physical wellbore 160. In such an embodiment, and the injecting step (e.g., 116) is alternated in time with the producing step (e.g., 120) and a time delay (i.e., a predetermined residence time such as the time delay 118) may be implemented between the injection step (e.g., 116) and the production step (e.g., 120).

Figure 8:
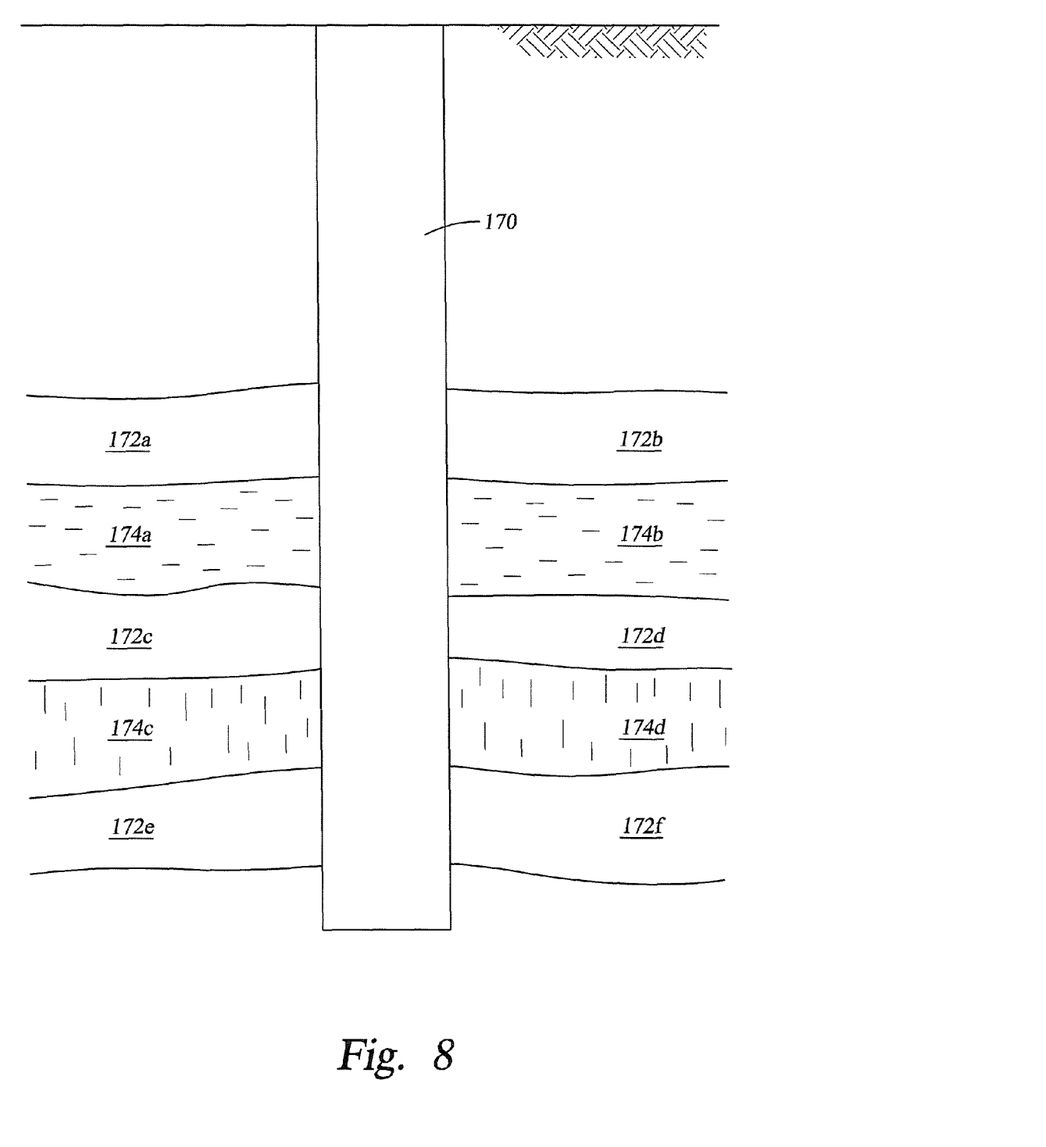
FIG. 8 illustrates an embodiment of the present invention wherein the injection well includes a plurality of horizontal completion intervals.

FIG. 8 illustrates an embodiment wherein an injection well 170 includes a plurality of horizontal completion intervals 172(*a-f*). In general, injection well 170 may be implemented in one or more of the embodiments shown in FIGS. 7A & 7B and/or any other appropriate embodiment. While six horizontal completion intervals 172 are illustrated, any suitable number of intervals may be used. In at least one embodiment, one or more fracture networks 174(*a-d*) may be induced by injecting $CO_2$ into the corresponding organic-rich rock formation. The fracture networks 174 may reside substantially between two adjacent completion intervals 172. As illustrated in FIG. 8, the predominant direction of one or more of the fracture networks 174, such as networks 174(*a*) and 174(*b*), may be substantially perpendicular to the wellbore 170. Additionally or in the alternative, the predominant direction of one or more of the fracture networks 174, such as networks 174(*c*) and 174(*d*), may be substantially parallel to the wellbore 170.

Figure 9:
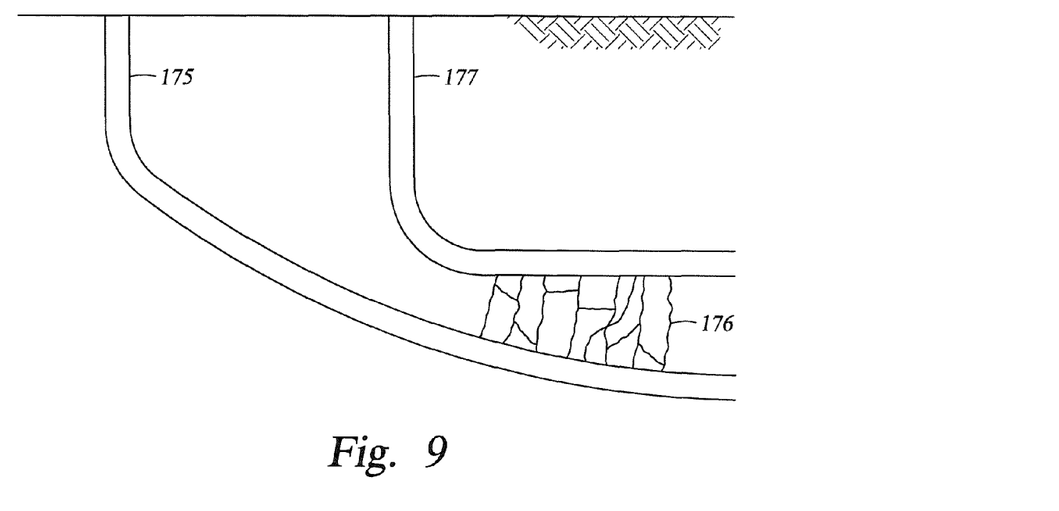
FIG. 9 illustrates an embodiment of the present invention wherein a fracture network connects an injection well with an offset production well.

FIG. 9 illustrates an embodiment wherein one or more completion intervals (i.e., one or more fracture networks) 176 fluidly couple an injection well 175 to an offset production well 177 (i.e. well 175 in fluid communication with well 177). In at least one embodiment, the fracture network 176 may be induced by injecting $CO_2$ into the corresponding organic-rich rock formation. However, the fracture network 176 may be induced using any appropriate technique to satisfy the design criteria of a particular embodiment.

Figure 10:
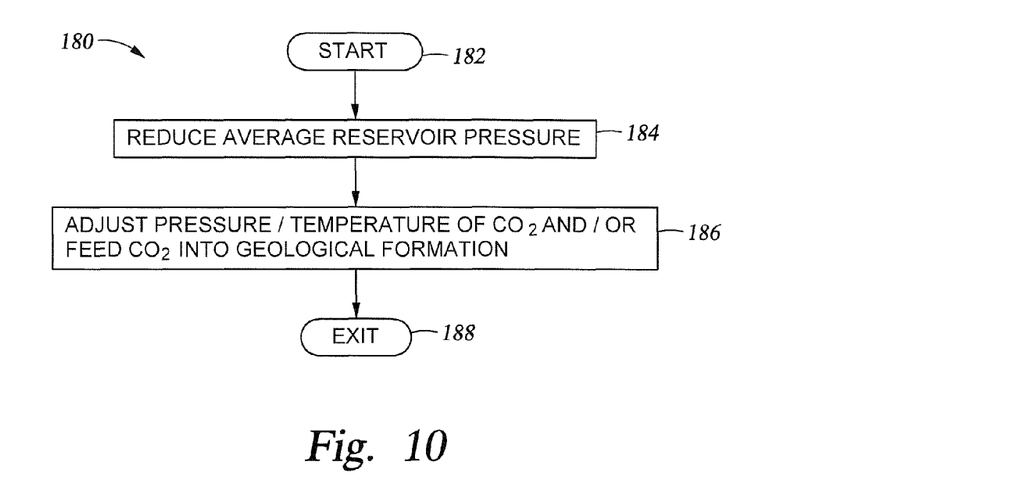
FIG. 10 is a flow diagram of a method for storing $CO_2$ in an organic-rich rock formation in accordance with at least one embodiment of the present invention.

Referring, now, to FIG. 10, a flow diagram is provided of a method 180 for storing $CO_2$ in an organic-rich rock formation. In at least one preferred embodiment, the organic-rich rock formation is a shale formation. The method 180 may be advantageously implemented in connection with any appropriate system to meet the design criteria of a particular application, such as one or more of the systems shown in and described with reference to FIGS. 7A, 7B, 8 and 9 of the present disclosure. The method 180 generally includes a plurality of blocks or steps (e.g., 182, 184, 186, etc.) that may be performed serially. As will be appreciated by one of ordinary skill in the art, the order of the steps shown in FIG. 10 is exemplary and the order of one or more steps may be modified within the spirit and scope of the present invention. Additionally, the steps of the method 180 may be performed in at least one non-serial (or non-sequential) order, and one or more steps may be omitted to meet the design criteria of a particular application. Block 182 represents an entry point into the method 180.

At block 184 the average reservoir pressure (e.g., average reservoir pressure in a drainage volume of a corresponding production well) is reduced until the average reservoir pressure is equal to a first predetermined pressure. It may be understood that an average reservoir pressure in the drainage volume of a production well may be determined using any of the methods which would be known to those skilled in the art of reservoir engineering. In at least one embodiment the reduction in the average reservoir pressure is accomplished by producing a hydrocarbon, such as natural gas, from the production well. However, any appropriate pressure reducing mechanism may be implemented to satisfy the design criteria of a particular embodiment. Furthermore, in various embodiments the predetermined pressure may be less than 2000 psi or, more preferably, between 1000 and 2000 psi.

At Block 186 $CO_2$ is fed into a corresponding injection well. As discussed previously, the injection well may be the same physical wellbore as a production well or the injection well may be physically distinct (but in fluid communication with) a production well. In at least one embodiment, the $CO_2$ may be fed at a temperature and/or a pressure predetermined to enhance physical and/or chemical mechanisms that cause $CO_2$ to enter a rock formation. More specifically, the predetermined pressure and the predetermined temperature may be determined by measuring a $CO_2$ adsorption isotherm in the organic-rich rock formation at a plurality of pressure and temperature combinations. Alternatively, the predetermined pressure and the predetermined temperature may be determined using a model that includes inputs corresponding to a $CO_2$ chemical and/or physical behavior in rock formation pore space, a $CO_2$ chemical and/or physical behavior in natural fractures, and/or an adsorption isotherm. In at least one embodiment, the $CO_2$ is fed at a pressure between 500 psi and 3500 psi and, more preferably, at a pressure between 1000 psi and 2000 psi. Block 188 generally represents an exit from the method 180.

It may be appreciated, then, that one or more embodiments of the present disclosure provide for storage of $CO_2$ in and/or enhanced recovery of hydrocarbons from organic-rich rock formations such as shale gas formations, oil shale formations and/or coal shale formations.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for producing hydrocarbons from and storing $CO_2$ in an organic-rich rock formation, the method comprising the steps of:
   injecting the $CO_2$ into an injection well in the organic-rich rock formation and producing the hydrocarbons, wherein the hydrocarbons substantially include natural gas, from a production well when a drainage volume of the production well has an average reservoir pressure equal to or less than a predetermined pressure, wherein the injection well is in fluid communication with the production well; and
   capping the production well and feeding the $CO_2$ into the injection well when the produced hydrocarbons include a $CO_2$ mole fraction greater than or equal to a predetermined mole fraction.

2. The method of claim 1 wherein the step of injecting $CO_2$ includes adjusting the pressure of the $CO_2$ to a predetermined value such that the injected $CO_2$ more readily displaces the hydrocarbons.

3. The method of claim 2 wherein the predetermined value is determined by measuring an adsorption isotherm of the $CO_2$ in the organic-rich rock formation at a plurality of pressures.

4. The method of claim 2 wherein a model is used to determine the predetermined value, the model including inputs corresponding to at least one of an adsorption isotherm, a chemical and physical behavior of the $CO_2$ in rock formation pore space, and a chemical and physical behavior of the $CO_2$ in rock formation natural fractures.

5. The method of claim 1 wherein the organic-rich rock formation is a shale formation.

6. The method of claim 5 wherein the $CO_2$ is injected at a bottom-hole pressure between 1000 psi and 2000 psi.

7. The method of claim 5 wherein the $CO_2$ is injected at a bottom-hole pressure between 500 psi and 3500 psi.

8. The method of claim 5 wherein the $CO_2$ is fed at a bottom-hole pressure between 1000 psi and 2000 psi.

9. The method of claim 5 wherein the $CO_2$ is fed at a bottom-hole pressure between 500 psi and 3500 psi.

10. The method of claim 1 wherein the step of injecting $CO_2$ includes adjusting the temperature of the $CO_2$ to a predetermined temperature such that the injected $CO_2$ displaces the hydrocarbons in the organic-rich rock formation at an increased rate.

11. The method of claim 10 where the predetermined temperature is determined by measuring an adsorption isotherm of the $CO_2$ in the organic-rich rock formation at a plurality of temperatures.

12. The method of claim 10 wherein a model is used to determine the predetermined temperature, the model including inputs corresponding to at least one of an adsorption isotherm, a chemical and physical behavior of the $CO_2$ in rock formation pore space, and a chemical and physical behavior of the $CO_2$ in rock formation natural fractures.

13. The method of claim 1 wherein the $CO_2$ is at a temperature less than or equal to 88 degrees Fahrenheit and the $CO_2$ is at a pressure greater than vapor pressure of the $CO_2$ at the temperature.

14. The method of claim 13 wherein the predetermined pressure is substantially equal to 2000 psi.

15. The method of claim 13 wherein the injecting step is performed only when the average reservoir pressure is greater than or equal to a second predetermined pressure, the second predetermined pressure substantially between 1000 psi and 1100 psi.

16. The method of claim 13 wherein the $CO_2$ is injected at a pressure less than a fracture pressure of the organic-rich rock formation.

17. The method of claim 13 wherein the $CO_2$ is in a liquid state during the injecting step.

18. The method of claim 13 wherein the $CO_2$ is in a liquid state during the feeding step.

19. The method of claim 1 wherein the depth of the injection well is greater than the depth of the producing well.

20. The method of claim 1 wherein the $CO_2$ is injected such that the injection well has a bottom-hole pressure greater than 1071 psi when the production well has a bottom-hole pressure less than 1071 psi.

21. The method of claim 1 wherein the $CO_2$ is injected such that the injection well has a bottom-hole pressure greater than a bottom-hole pressure of the production well and less than a fracture pressure of the organic-rich rock formation.

22. The method of claim 1 wherein the injection well includes a plurality of horizontal completion intervals.

23. The method of claim 22 wherein one or more fracture networks reside substantially between two adjacent completion intervals.

24. The method of claim 23 wherein the one or more fracture networks are substantially perpendicular to a wellbore of the injection well.

25. The method of claim 23 wherein the one or more fracture networks are induced by injecting $CO_2$ into the organic-rich rock formation.

26. The method of claim 23 wherein the one or more fracture networks are substantially parallel to a wellbore of the injection well.

27. The method of claim 1 further including an initial production step for producing the hydrocarbons from the production well in the organic-rich rock formation when the average reservoir pressure is greater than the predetermined pressure.

28. The method of claim 27 wherein a single well is implemented as both the production well and the injection well, and the injecting step is alternated in time with the producing step.

29. The method of claim 28 wherein the producing step is delayed for a predetermined residence time after completion of the injecting step.

30. The method of claim 1 wherein pressure of the $CO_2$ during the feeding step is cycled between a first and a second predetermined $CO_2$ feed pressure levels; and the first and second predetermined $CO_2$ feed pressure levels are maintained for first and second feed times, respectively.

31. The method of claim 30 wherein the first and second feed times are determined by measuring a sorption time of $CO_2$ in the organic-rich rock formation.

32. The method of claim 30 wherein the first and second feed times are substantially identical.

33. The method of claim 30 wherein the first and second feed times are modified between cycles of the first and second predetermined $CO_2$ feed pressure levels.

34. The method of claim 1 wherein pressure of the $CO_2$ during the injecting step is cycled between first and second predetermined $CO_2$ injection pressure levels; and the first and second predetermined $CO_2$ injection pressure levels are maintained for first and second injection times, respectively.

35. The method of claim 34 wherein the first and second injection times are determined by measuring a sorption time of $CO_2$ in the organic-rich rock formation.

36. The method of claim 34 wherein the first and second injection times are substantially identical.

37. The method of claim 34 wherein the first and second injection times are modified between cycles of the first and second predetermined $CO_2$ injection pressure levels.

38. The method of claim 1 wherein the production well and the injection well correspond to physically distinct wellbores and the production well is capped off for a predetermined shut-in period at the end of the injecting step.

39. The method of claim 38 wherein the predetermined shut-in period corresponds to the sorption time of $CO_2$ in the organic-rich rock formation.

40. The method of claim 1 wherein the step of injecting the $CO_2$ into the injection well includes pulsing a corresponding supply of $CO_2$.

41. The method of claim 40 wherein the $CO_2$ is injected such that the injection well has a bottom-hole pressure greater than 1071 psi when the production well has a bottom-hole pressure less than 1071 psi.

42. The method of claim 1 wherein the step of feeding the $CO_2$ into the injection well includes pulsing a corresponding supply of $CO_2$.

43. The method of claim 1 wherein the predetermined mole fraction is substantially equal to 25%.

44. The method of claim 1 wherein the predetermined mole fraction is substantially equal to 60%.

45. The method of claim 1 wherein the predetermined mole fraction is substantially equal to 90%.

* * * * *